US012711110B1

(12) United States Patent
Schrum

(10) Patent No.: US 12,711,110 B1
(45) Date of Patent: Aug. 18, 2026

(54) DRY RUN CAPABILITY FOR DETERMINING WHETHER DATA DEFINITION LANGUAGE STATEMENTS CAN BE EXECUTED WITH ZERO DOWN TIME

(71) Applicant: Oracle International Corporation, Redwood Shores, CA (US)

(72) Inventor: Allan George Schrum, Wilsall, MT (US)

(73) Assignee: Oracle International Coporation, Redwood Shores (CA)

( * ) Notice: Subject to any disclaimer, the term of this patent is extended or adjusted under 35 U.S.C. 154(b) by 0 days.

(21) Appl. No.: 19/056,607

(22) Filed: Feb. 18, 2025

(51) Int. Cl.
*G06F 16/00* (2019.01)
*G06F 16/21* (2019.01)
*G06F 16/25* (2019.01)

(52) U.S. Cl.
CPC .......... *G06F 16/211* (2019.01); *G06F 16/252* (2019.01)

(58) Field of Classification Search
CPC ............................ G06F 16/211; G06F 16/252
See application file for complete search history.

(56) References Cited

U.S. PATENT DOCUMENTS

2019/0303460 A1* 10/2019 Barbarek ............ G06F 16/2379
2020/0065238 A1* 2/2020 Samantaray ........ G06F 11/3698

FOREIGN PATENT DOCUMENTS

CN 111125064 A * 5/2020 ......... G06F 16/2282
CN 117076308 A * 11/2023 .......... G06F 11/3684
TW 202221526 A * 6/2022 ............ G06F 16/211

OTHER PUBLICATIONS

Mydbops,"An Overview of DDL Algorithm's in MySQL (cover MySQL 8)",www.Mydbops.com,Mar. 4, 2020,pp. 1-18 (Year: 2020).*
Jong et al.,"Zero-Downtime SQL Database Schema Evolution for Continuous Deployment",2017,IEEE,pp. 1-10 (Year: 2017).*
Atchariyachanvanich et al.,"Development of a MySQL Sandbox for Processing SQL Statements: Case of DML and DDL Statements",2017,IEEE,pp. 1-6 (Year: 2017).*
"MySQL 8.0 Reference Manual—Table of Contents," Oracle Help Center, Document generated on: Mar. 26, 2025 (revision: 81314), original date found via Google as Apr. 18, 2018.
"MySQL 8.0 Reference Manual—Chapter 15: SQL Statements," Oracle Help Center, Document generated on: Mar. 26, 2025 (revision: 81314), original date found via Google as Apr. 18, 2018.

* cited by examiner

*Primary Examiner* — Alexander Khong
(74) *Attorney, Agent, or Firm* — Vista IP Law Group, LLP

(57) ABSTRACT

A computer program product, system, and computer implemented method for a dry run capability for determining whether data definition language statements can be executed with zero down time. This generally comprise using a dry run method to determine what algorithm would be used with SQL data definition language statements (DDL). Specifically, The DDL statement(s) are processed but are not permitted to modify a corresponding SQL database. Such statements are processed up to the point where an algorithm to be used for the execution of such a statement can be confirmed (whether specified or based on a hierarchy of approaches). In some embodiments, the approach includes both a primary SQL database and a secondary SQL database where commands that modify the primary SQL database are reproduced at the replica SQL database but commands that are executed using a dry run method are not executed against the replica database.

20 Claims, 14 Drawing Sheets

DRY RUN CAPABILITY FOR DETERMINING WHETHER DATA DEFINITION LANGUAGE STATEMENTS CAN BE EXECUTED WITH ZERO DOWN TIME

BACKGROUND

The rise of database systems and their usefulness for collecting, managing, and analyzing data has led to their prevalence in modern society. For example, various types of relational database systems have been developed for tracking and managing data for untold numbers of organizations. However, as the use of the database systems have spread, so has the reliance on those databases for the activities of the entities that use them.

As a side effect of the reliance on these database systems, the tolerance for downtime has decreased. None-the-less the systems that manage this data and the arrangement of that data are continually changing. This makes management of these systems more difficult.

To add to the continually changing nature of these systems and the data therein, these systems are often tied to secondary or replica systems where the changes at one database are intended to be replicated to the replica system(s). This can be useful for backup purposes and failover purposes to provide increased reliability. For example, if one system fails another is ready to take its place and allow for continued operation over the same or largely the same dataset. However, over time these systems tend to diverge in form even if not in the contents therein.

For these reasons, it has become more and more difficult to manage these datasets in a timely manner. In addition, modifications on one dataset may not necessary be performed in the same manner on a main dataset and a replica dataset at least in part because of the divergence in the form of those datasets or a software versioning difference. However, without more, these modifications may result in downtime for database users. Unfortunately, the current ways to address this issue is at best cumbersome and time consuming.

Therefore, there is a need for an improved approach to manage database systems to allow for determining in advance whether a corresponding database modification can be executed with effectively zero down time.

SUMMARY

Embodiments of the present disclosure provide a method, apparatus, and product for a dry run capability for determining whether data definition language statements can be executed with zero down time.

The approaches disclosed herein generally comprise an approach to using a dry run method to determine whether any particular command can actually be executed or what algorithm would be used with SQL data definition language statements (DDL). Specifically, a dry run mode is entered prior to or as part of providing a DDL statement(s). The DDL statement(s) are then processed but are not permitted to modify a corresponding SQL database. Essentially, the DDL statement(s) are processed by an SQL query manager that includes dry run support. The query manager can validate the DDL statement(s). Additionally, if an execution algorithm is specified, the query manager that includes dry run support determines at least if the specified algorithm can be used for the DDL statement(s). In some embodiments, a DDL statement is transmitted without specifying an algorithm to be used, and the query manager that includes dry run support can determine the least blocking algorithm that would be used (e.g., instant, or if not instant then in-place, and if not instant or in-place then copy) and provide an indication as to what algorithm would be used for the DDL statement(s).

In some embodiments, the approach includes both a primary SQL database and a secondary SQL database where commands that modify the primary SQL database are reproduced at the replica SQL database but commands that are executed using a dry run method are not executed against the replica database.

Further details of aspects, objects, and advantages of the disclosure are described below in the detailed description, drawings, and claims. Both the foregoing general description and the following detailed description are exemplary and explanatory and are not intended to be limiting as to the scope of the disclosure.

BRIEF DESCRIPTION OF THE DRAWINGS

The drawings illustrate the design and utility of embodiments of the present disclosure, in which similar elements are referred to by common reference numerals. To better appreciate the advantages and objects of embodiments of the disclosure, reference should be made to the accompanying drawings. However, the drawings depict only certain embodiments of the disclosure, and should not be taken as limiting the scope of the disclosure. The drawings use like reference numerals to identify like elements, and unless otherwise specified, any description for that element may be applicable to each use of that reference numeral were appropriate.

DETAILED DESCRIPTION OF THE EMBODIMENTS OF THE DISCLOSURE

Figure 1A:
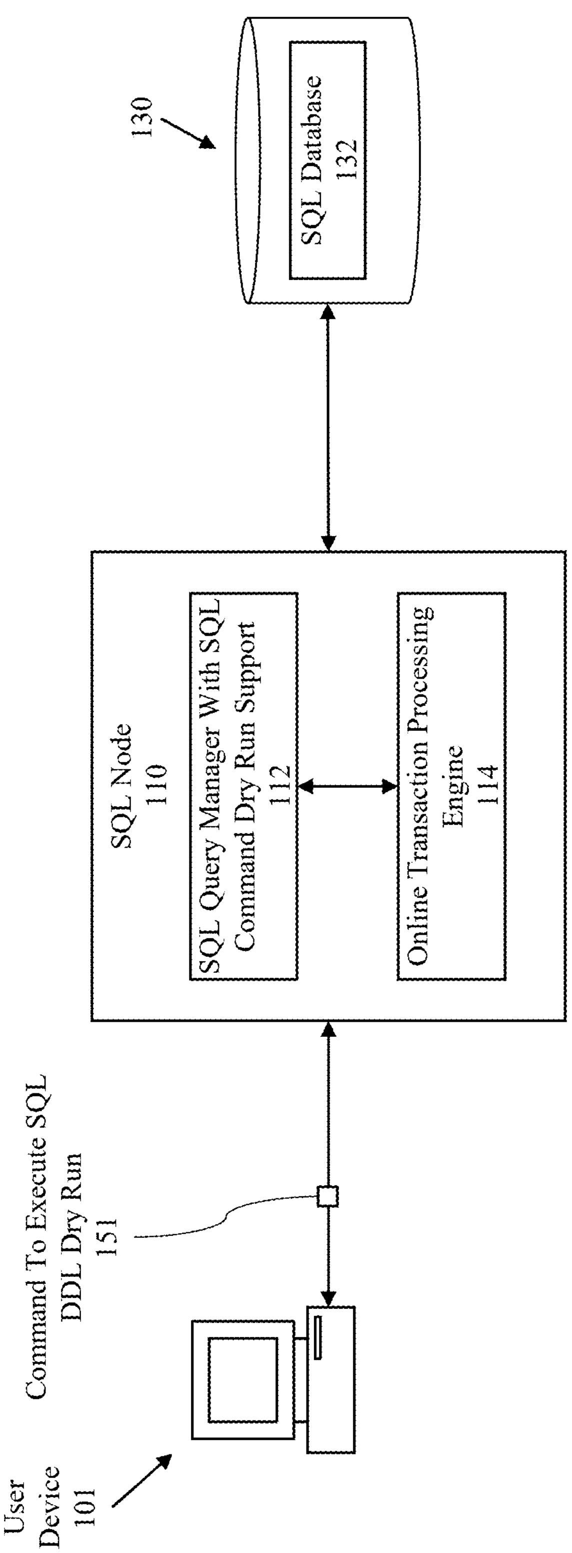
FIGS. 1A-1B illustrate example systems in which some embodiments of the disclosure may be implemented.

Various embodiments are described hereinafter with reference to the figures. It should be noted that the figures are not necessarily drawn to scale. It should also be noted that the figures are only intended to facilitate the description of the embodiment(s) and are not intended as an exhaustive description of the disclosure or as a limitation on the scope of the disclosure. In addition, an illustrated embodiment need not have all the aspects or advantages shown. An aspect or an advantage described in conjunction with a particular embodiment is not necessarily limited to that embodiment and can be practiced in any other embodiments even if not so illustrated.

Generally, a structured query language (SQL) database is a type of relational database that uses Structured Query Language (SQL) to manage and manipulate data. SQL databases are designed to store large amounts of structured data in an organized manner, making it relatively easy to retrieve, update, and manage information efficiently. Essentially, a relational database, has data that is organized into tables, which consist of rows and columns. Each row represents a unique record, and each column represents a specific attribute of the data in the column. Tables can be related to each other through keys, allowing for complex queries and data manipulation. SQL basically adds in a specialized programming language that is used to interact with the relational databases. It allows users to perform various operations such as querying data, inserting new records, updating existing records, and deleting records. SQL also supports creating and modifying database structures, such as tables and indexes.

Approaches are provided herein to determine whether a data definition language (DDL) command can be executed without actually modifying any tables in the SQL database. In some embodiments, this includes determining an algorithm that an SQL node would use to process an SQL command. Approaches are provided herein to determine an algorithm that an SQL node would use to process an SQL command. Specifically, provided herein is a dry run capability for an SQL query manager that can be used to determine whether a DDL command can be executed and if applicable, what algorithm would be used to execute that command without allowing for any changes to be made to an SQL database. For example, as provided herein, a user device might be used to generate a command to execute an SQL ALTER TABLE command dry run that is sent to and received by the SQL node. This is particularly useful where an SQL database is associated with a replica SQL database because the replica database may not be 100% identical to the SQL database which can results in different algorithms being required to execute the command.

For example, an ALTER TABLE command may be executed using one of three approaches: instant, in-place, or copy. Generally, an "instant" algorithm is used when only the metadata of a table would be changed by the ALTER TABLE command. The instant algorithm is technically a blocking update but it is only blocking for the time that it takes to update the metadata for the corresponding table which can be done very quickly and therefore does not result in noticeable downtime for a user. An in-place algorithm is used when the ALTER TABLE command requires an update to the structure (columns) of the table, rebuilding the data (rows) of the table, or some combination thereof, but where the rebuilding of the data (rows) can be done in a non-blocking manner. An in-place algorithm may also include a metadata update for the table. Finally, a copy algorithm is blocking for the duration of the execution and is used by default when an instant or in-place algorithm cannot be used.

Unfortunately, if an ALTER TABLE command specifies the algorithm to be used, the database will try to use that algorithm and no other. As a result, if the ALTER TABLE command cannot be executed using the specified algorithm, the ALTER TABLE command will not be executed. Further, without more, current approaches do not provide a way for a user (which may include an administrator) to determine in advance of issuing an ALTER TABLE command, which algorithm will be used when the algorithm is not specified. Thus, in order to avoid downtime a user would specify an instant or in-place algorithm. This would be fine if the SQL database is not associated with a replica SQL database. However, even if the SQL database can execute the ALTER TABLE command using the specified algorithm, there is no guarantee that the specified algorithm can also be used at the replica database. Unfortunately, if the replica SQL node fails to execute the ALTER TABLE command against the replica SQL database the replica SQL database would be different from the primary database because changes made by the alter table command at the primary SQL database are not reproduced at the replica SQL database.

In order to address this issue, the present approach provides for use of a command to perform a DDL dry run to determine whether the command can be executed. In some embodiments, the present approach provides for use of a command to perform am ALTER TABLE dry run to determine which algorithm an SQL database would use to execute the command without actually modifying the SQL database. A command that is executed using a dry run would not be replicated to the replica SQL database because only commands that change the SQL database are replicated. In some embodiments, if it is determined that the SQL database would use a desired algorithm (e.g., an instant or in-place algorithm) to execute a DDL command, a corresponding command can be sent to the SQL database without specifying the algorithm to be used. In this way the primary SQL database avoids downtime, while the replica SQL database maintains consistency. Alternatively, if it is determined that the primary SQL database would not use a desired algorithm (e.g., an instant or in-place algorithm) to execute the DDL command (e.g., ALTER TABLE command), a user can use an alternative approach to avoid downtime such as replication of the databases, updating the replicated database, and then switching all operations over to the replicated database and reproducing any commands that are not yet incorporated into the replicated database.

In some embodiments, the approach comprises a computer-implemented method, a non-transitory computer readable medium, and a computing system that maintains a structure query language (SQL) database frontend for an SQL database; receives an ALTER TABLE command at the SQL database frontend to be processed using a dry run mode, wherein commands executed using the dry run mode are not permitted to modify the SQL database; and sends a response indicating if the ALTER TABLE command can be executed using an instant algorithm or an in-place algorithm.

In some embodiments, the approach also comprises maintaining a second SQL database, the second SQL database comprising a replica of the SQL database, wherein the SQL database has a schema and the second SQL database has second schema that is different from the schema. The schema may also comprise at least a character type specification at a level of a column of a table and the second schema comprises a character type specified at a level of a second table, wherein the second table is a replica of the table.

In some embodiments, the approach also comprises receiving a dry run mode command at the SQL database frontend; and setting a parameter to indicate that the SQL database frontend is in a dry run mode. Additionally, the parameter may be cleared in response to completing processing of the ALTER TABLE command or the parameter may be set until dry run mode command is received that specifies exiting the dry run mode. Furthermore, in some embodiments, an ALTER TABLE command comprises at least a value that indicates that the command is to be processed using a dry run mode.

Figure 1B:
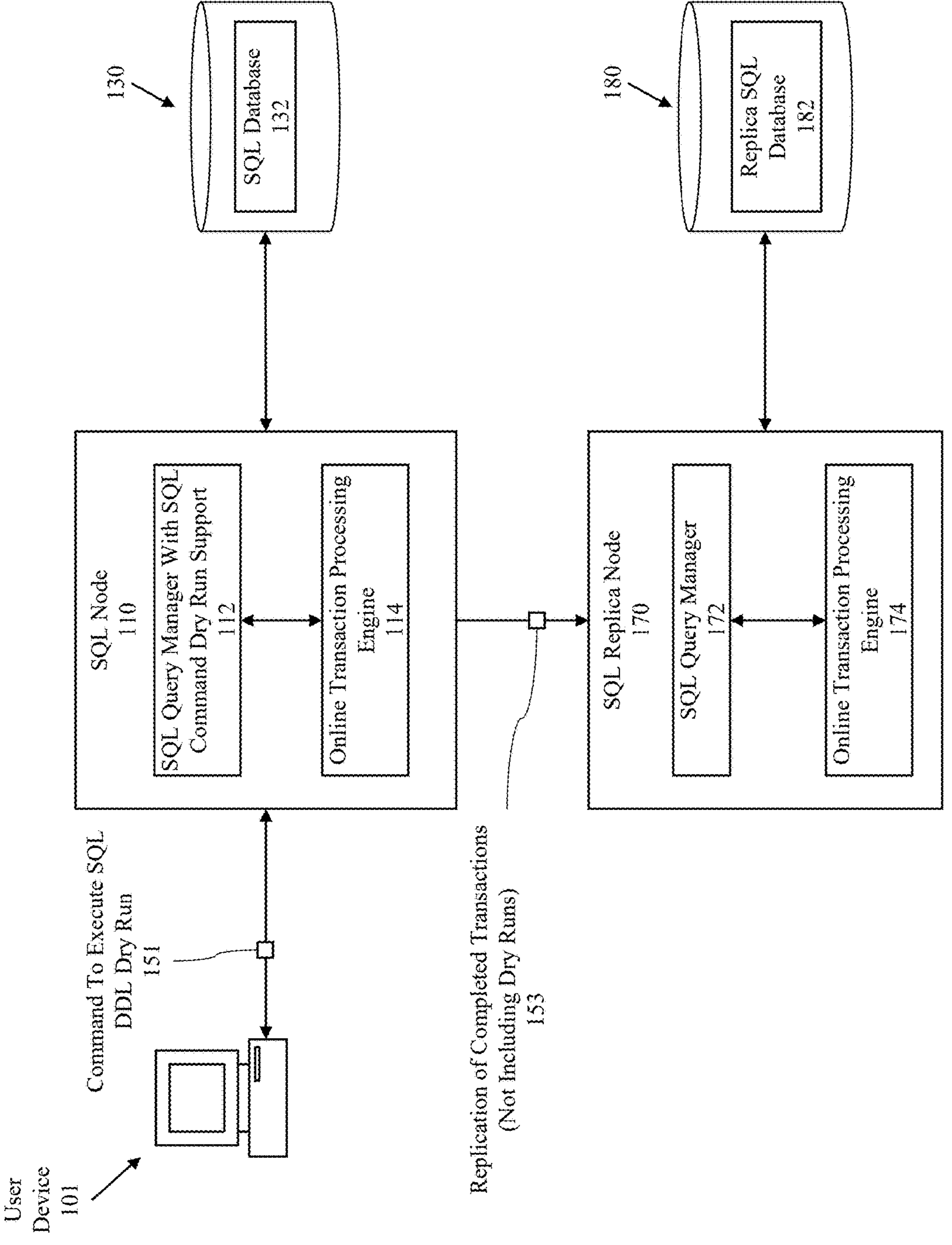

FIGS. 1A-1B illustrate example systems in which some embodiments of the disclosure may be implemented. Generally, the example systems include one or more computing nodes or hosts (e.g., SQL nodes) and one or more SQL databases.

FIG. 1A illustrates an example system where a user device, is connected to an SQL node which is connected to an SQL database. As illustrated here, a single user device is connected to an SQL node which is itself connected to an SQL database. However, other permutations could be provided such as one with multiple user devices connected to the SQL node, multiple SQL nodes, multiple SQL databases accessible via a single SQL node, an SQL database that is within an SQL node, or any combination thereof.

As an initial matter, a user device (e.g., 101 interacts with an SQL database (see e.g., 132 on storage 130) via an SQL node (e.g., 110)—e.g., using one or more sessions. The user device 101 comprises any type of computing device that may be used to operate or interface with the SQL node, whether directly or indirectly. Examples of such a computing device include workstations, personal computers, laptop computers, or remote computing terminals. Computing devices may also comprise any type of portable tablet device, including for example, tablet computers, and portable readers. Computing devices may also include any mobile device that can suitably access any computing systems on the Internet such as smartphones and mobile handsets. It is noted that this disclosure is not limited in its application to just these types of devices. The embodiments of the disclosure are applicable to any computing device that works in conjunction with access to digital information stored on, as an example, the Internet. One of ordinary skill in the art may appreciate that embodiments of this present disclosure may be implemented on the Internet, on a closed network, on a hybrid open and closed network, or on a cloud network.

Furthermore, the user device might be controlled by a user, another service, an administrator, or comprise any other user device that allows for access or management of an SQL database. Any SQL Database can be associated with multiple SQL nodes that are each in turn associated with one or more user devices such as user device 101. In some embodiments, an SQL database (e.g., 132) and the SQL node (e.g., 110) may be combined together. SQL also supports creating and modifying database structures, such as tables and indexes. For example, as provided herein, a user device might be used to generate a command to execute a DDL command (e.g., SQL ALTER TABLE command) dry run (see e.g., 151) that is sent to and received by the SQL node (see e.g., 110). As provided herein a dry run in SQL is a way to process and SQL command but without modifying the underlying SQL database. As will be discussed further herein, this allows for processing that can be used to determine how a corresponding non-dry run command would be executed.

As illustrated, the SQL node 110 includes an SQL query manager with SQL command dry run support 112 and an online transaction processing engine 114. However, more generally, an SQL node executes a software stack for implementing an SQL database for processing queries (e.g., simple or complex SQL queries). The SQL node receives SQL commands and routes them to the SQL query manager 112. If the command is of a dry run command type, the SQL query manager will process the command up to but not including actually modifying the SQL database. Specifically, the SQL query manager with SQL command dry run support (e.g., 112) will process that command to determine whether a DDL command can be executed and potentially an algorithm of execution, but will not write to the SQL database. However, if the command is not a dry run command, the command with be processed normally which may include modifying the SQL database by at least sending a corresponding portion to the online transaction processing engine (e.g., 114). The online transaction processing engine (see 114) implements any specified changes to the SQL database (see e.g., 132). After which a corresponding command or information representing the command will be sent to a replica SQL database if one is configured. In contrast, commands that will be processed using a dry run method will generally not have a form that is executed by the online transaction processing engine and will not be forwarded to a replica database.

An SQL database (e.g., 132) may be provided on one or more storage devices (e.g., 130) and accessible to the SQL node. For instance, SQL queries are executed against an SQL database using an online transaction processing engine (see 114) by at least accessing one or more storage devices (see e.g., 130) that maintain the data of the SQL database (see e.g., 132). In some embodiments, these queries might be simple or complex queries. Where simple queries comprise small lookup operations (e.g., operations that are to return singular values, rows, or columns, or operate on singular tables), and complex queries comprise queries that return multiple values, require multiple calculations or operations, or operate on multiple tables to determine an output. In some embodiments, the SQL database is used to store large objects for the SQL database (e.g., LOBS or Binary LOBS—which are large objects that may comprise structured or unstructured data). In some embodiments, the SQL database (see e.g., 132) stores data any in any number of formats (e.g., blocks, objects, LOBs, BLOBs) and may present that data in any form to a user using a corresponding frontend or backend process.

FIG. 1B illustrates an example system where a SQL replica node and a replica SQL database is added to the illustration of FIG. 1A. As provided here, the description of like identified elements from different figures are also applicable to the present figure.

The SQL replica node 170 is largely similar to the SQL node 110. However, while the SQL query manager in the SQL node (see 112) includes SQL command dry run support, the SQL query manager at the replica node (see 170) does not necessarily need to include the dry run support feature. However, the storage 180 is essentially the same as that of 130 and the replica SQL database is largely the same as the replicated SQL database (see 132). However, due to the nature of how the SQL and replica SQL database are created, the exact form that each database includes may differ.

Specifically, as transaction are completed at a to be replicated SQL database (see 110) those transactions are replicated to the SQL replica node (see 170 and replication of completed transactions (not including dry runs) 153). Each replicated transaction will then be processed by the replica node (see 170) using a SQL query manager (see 172) and an online transaction processing engine (see 174) to modify the replica SQL database (182) as indicated. Because these systems are separate and the way in which SQL commands are processed, a command received by different query managers may be processed in different manners—e.g., due to applied optimization logic and a current SQL database arrangement. For the same reasons, an ALTER TABLE command that specifies an "instant" or "in-place" execution algorithm might be successfully completed on a SQL node but fail on a corresponding replica node. This would result in a modification to the main SQL database (see e.g., 132) that is not reproduced at the replica SQL database (see e.g., 182). To solve this issue, the present approach provides a dry run capability where a DDL command (e.g., ALTER TABLE command) can be processed using a dry run mode—e.g., to determine whether the SQL node would use an "instant", "in-place" or "copy" algorithm to execute a corresponding DDL command. If the SQL command can be executed or can be executed using a desired algorithm, the command is then executed without a flag specifying the desired algorithm. The SQL node (see 110) would then process that command and after completion, replicate that command to a replica SQL database. In some embodiments, the query manager on the replica node includes dry run support and may also use a dry run mode to determine a corresponding algorithm that would be used for a DDL command outside of the dry run mode.

Figure 2:
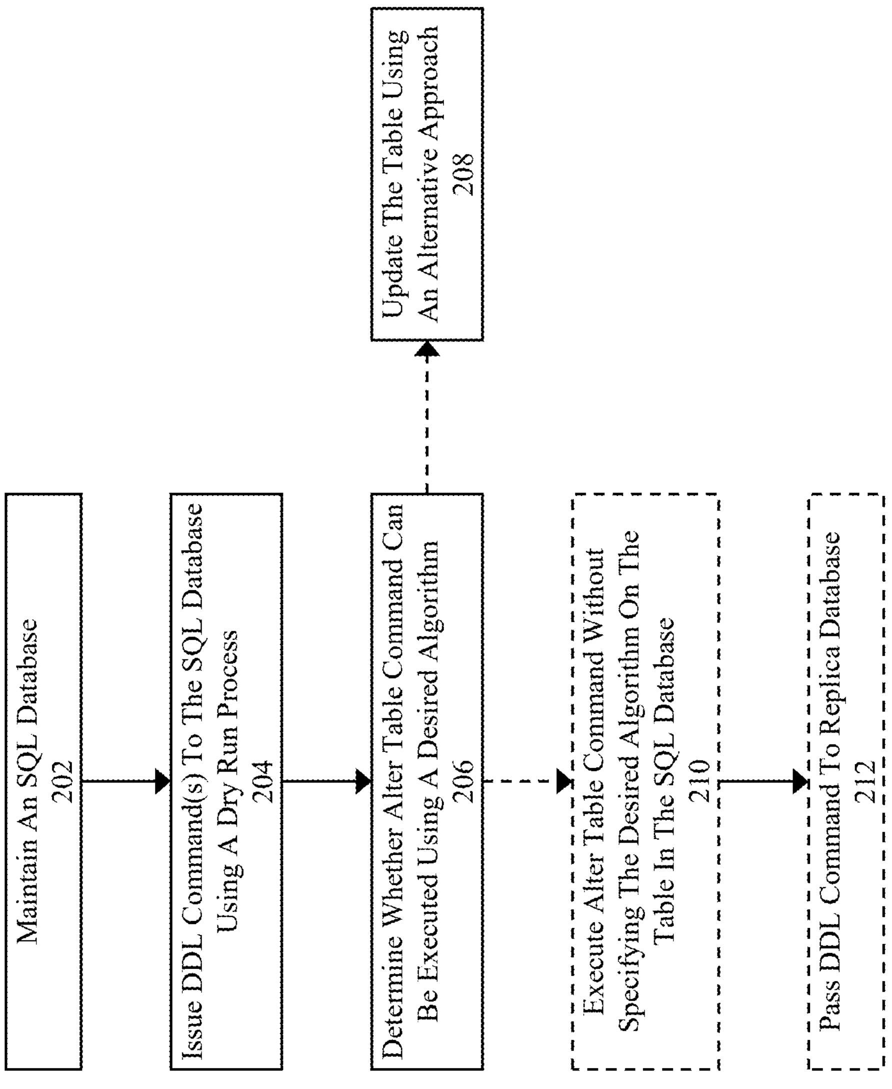
FIG. 2 illustrates a flow for determining whether data definition language statements can be executed with zero down time by at least providing a dry run capability according to some embodiments.

FIG. 2 illustrates a flow for determining whether data definition language statements can be executed with zero down time by at least providing a dry run capability according to some embodiments. Generally, the approach comprises maintaining an SQL database, issuing command that uses a dry run process, determining whether the command(s) can be executed using a desired algorithm, and if so, executing the command without specifying the desired algorithm and passing that command to a replica database. Alternatively, if the command cannot be executed using at least one of the desired algorithms, the desired modification may be achieved using an alternative approach.

At 202 an SQL database is maintained. Generally, an SQL database comprises a relational database that is configured to be able to be accessed using an SQL database frontend. For instance, FIG. 1A illustrated an SQL database 132 that is accessible using an SQL database frontend (see e.g., SQL query manager with SQL command dry run support 112 and online transaction processing engine 114 on SQL node 110).

At 204 a DDL (e.g., ALTER TABLE) command that is to be processed using a dry run process is issued. For example, a user device (e.g., 101) that is connected to the SQL node with an active session might issue the ALTER TABLE command (e.g., 151) that is transmitted to an SQL node (e.g., 110).

Subsequently, at 206, the DDL (e.g., ALTER TABLE) command is analyzed to determine whether the SQL command can be executed using a desired algorithm (e.g., an instant or in-place algorithm). Generally, an DDL commands are use to create, modify, or delete database tables in the SQL database. For example, an ALTER TABLE command is used to change the structure of the database table such as by changing the table metadata, adding or removing a column, changing the size of varchar strings, restrictions, or other parameters. However, an ALTER TABLE command is not normally used to change the data therein. As known in the art, each table in an SQL database is associated with a set or metadata that pertains to the entire table, a table structure that defines the columns in the table and how to access the data therein, and a set of rows that contain the data. An ALTER TABLE command is one of a number of commands that are commonly known as data definition language (DDL) commands that may be used to change SQL database structures such as tables, indexes, and schemas and is but one DDL command that can be processed using the dry run approaches provided herein. Such approaches can be used to determine whether a DDL command (e.g., an ALTER TABLE command) can be executed using a desired algorithm (e.g., an instant or in-place algorithm) or as discussed further below. Briefly, this comprises processing the DDL command (e.g., ALTER TABLE command) to determine which algorithm is to be used but without issuing or allowing any actual modifications to be made to the SQL database.

In response to a determination that a DDL command (e.g., ALTER TABLE command) cannot be executed using a desired algorithm, an alternative approach is taken at 208. For instance, if the DDL command is an ALTER TABLE command this may comprise updating the table using an algorithm that blocks other writes or creating a duplicate instance of the active SQL database, modifying the table at the duplicate instance of the SQL database according to the ALTER TABLE command, performing catchup operations to duplicate any changes that occurred at the currently active SQL database before then switching all operations, sessions, etc. over to the duplicate instance of the SQL database.

In response to a determination that the DDL command (e.g., ALTER TABLE command) can be executed using the desired algorithm (e.g., an instant or in-place algorithm), the command may be executed at 210 without specifying the algorithm to be used. Generally, an SQL frontend is configured to use a least restriction approach to execute a DDL command. For this reason, if an instant algorithm can be used, the SQL frontend will use the instant algorithm. When an instant algorithm cannot be used but an in-place algorithm can be used, the SQL frontend will use the in-place algorithm. It is only when the SQL frontend cannot use an instant or in-place algorithm that a blocking copy algorithm would be used. Presuming that the DDL command is executed it would be subsequently passed to any replica database(s) at 212.

Figure 3A:
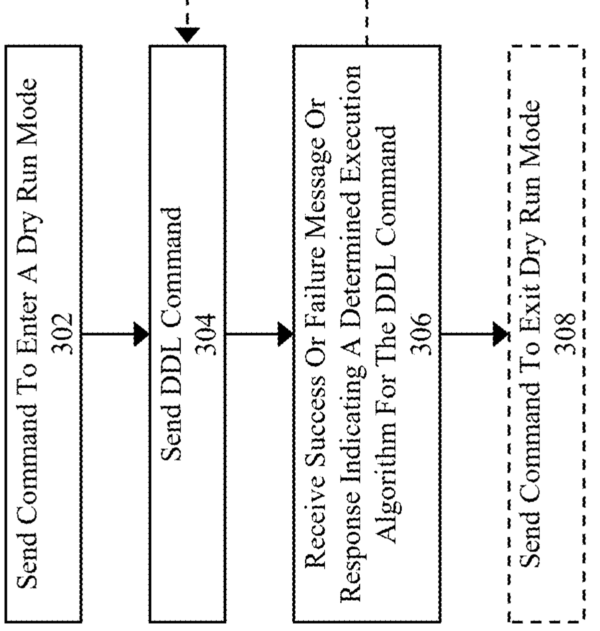
FIGS. 3A-3C illustrate flows for sending a DDL command to be processed using a dry run mode and receiving results for the command according to some embodiments.
Figure 3B:
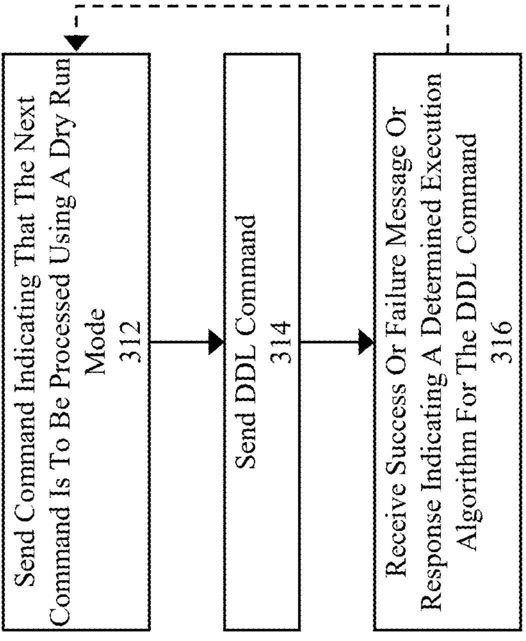
Figure 3C:
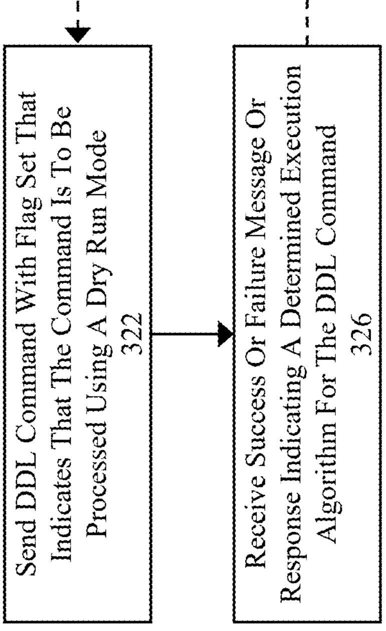

FIGS. 3A-3C illustrate flows for sending a DDL command to be processed using a dry run and receiving results for the command according to some embodiments. Generally, the approach includes a way to indicate to the SQL query manager with SQL command dry run support that a transmitted command is to be processed using a dry run approach.

FIG. 3A illustrate a flow for a first approach for sending a DDL command (e.g., an ALTER TABLE command) to be processed using a dry run and receiving results for the command according to some embodiments. Generally, the first approach uses a mode setting technique to specify that a command is to be executed using a dry run process prior to sending a corresponding command. Because the first approach relies on at least a separate mode setting step, DDL commands to be processed using the dry run mode do not need to be modified to support a dry run.

At 302, a command is sent to indicate that the current session should be placed into a dry run mode. For instance, a user device (e.g., 101) that is connected to an SQL node (e.g., 110) transmits a command to the SQL node to enter a dry run mode. In some embodiments, the user device will wait for a success/failure message from the corresponding recipient (e.g., an SQL node). In some embodiments, the user device will presume that the dry run mode is set. After a success message or at least lack of a failure message from the recipient, the process continues at 304 where a DDL command (e.g., an ALTER TABLE command) is sent.

As provided here, the current session with the SQL database is in a dry run mode. Thus, no special modification of a DDL command (e.g., an ALTER TABLE command) is required to indicate that the command is to be processed using a dry run mode. Thus, at 304 a DDL command is sent to the SQL frontend. In some embodiments, the DDL command comprises an ALTER TABLE command that includes a specification of an algorithm to be used (e.g., instant or in-place) for execution. In some embodiments, an algorithm is not specified.

Subsequently, the user device receives a success or failure message—e.g., from the SQL frontend at 306. In some embodiments, the success or failure message does not specify an algorithm to be used for execution of the DDL command. Whereas in other embodiments, the success or failure message specify an algorithm to be used for execution of the DDL command. After which, the process may return to 304 to issue another DDL command. For example, another ALTER TABLE command or potentially to 308 where the dry run mode exited using an exit dry run mode command.

In some embodiments, a DDL command (e.g., an ALTER TABLE instant command) is first sent at 304 with a subsequent DDL command (e.g., an ALTER TABLE in-place command) being sent at 304 in response to receipt of a failure message 306. In some embodiments, a DDL command (e.g., an ALTER TABLE command) is sent at 304 with a subsequent success message indicating the algorithm that would be used to execute the command if not in a dry run mode. For example, an ALTER TABLE command is sent with a specification of instant, in-place, or copy at 304. Subsequently, a success message is received at 306 that specifies the mode that would be used to execute the command—e.g., instant, in-place, or copy.

FIG. 3B illustrate a flow for a second approach for sending a DDL command (e.g., an ALTER TABLE command) to be processed using a dry run and receiving results for the command according to some embodiments. Generally, the second approach uses a special command that indicates that the next command is to be processed using a dry run process prior to sending a corresponding command. Such an approach is similar to the dry run mode discussed above in regard to FIG. 3A but relies on an instruction being issued for each command to be processed. Because the second approach relies on at least a separate command that indicates that the next command is to be executed using a dry run process, commands to be processed with a dry run do not need to be modified to support the dry run.

At 312, the special command is sent to indicate that the next command in the current session should be processes using a dry run mode. For instance, a user device (e.g., 101) that is connected to an SQL node (e.g., 110) transmits the special command to the SQL node that indicates that the next command should be processed using the dry run mode. In some embodiments, the user device will wait for a success/failure message from the corresponding recipient (e.g., an SQL node). In some embodiments, the user device will presume that the special command has been received and will be honored. After a success message or at least lack of a failure message from the recipient, the process continues at 314 where a DDL command is sent.

As provided here, the current session with the SQL database is now configured to process the next command using a dry run process. Thus, no special modification of a DDL command (e.g., an ALTER TABLE command) is required to indicate that the command is to be processed using a dry run process. Thus, at 314 a DDL command is sent to the SQL frontend. In some embodiments, the DDL command comprises an ALTER TABLE command that includes a specification of an algorithm to be used (e.g., instant or in-place) for execution. In some embodiments, the DDL command does not specify an algorithm to be used.

Subsequently, the user device receives a success or failure message—e.g., from the SQL frontend at 316. In some embodiments, the success or failure message does not specify an algorithm that would be used for execution of the command. Whereas in other embodiments, the success or failure message specify an algorithm that would be used for execution of the command. After which the process may return to 312 to issue another special command followed by a DDL command (e.g., an ALTER TABLE command) at 314.

In some embodiments, a DDL command (e.g., an ALTER TABLE instant command) is first sent at 314 with a subsequent special command being sent at 312 followed by another DDL command (e.g., an ALTER TABLE in-place command) at 314 in response to receipt of a failure message 316. In some embodiments, a DDL command (e.g., an ALTER TABLE command) is sent at 314 with a subsequent success message indicating the algorithm that would be used to execute the command if not for the dry run. For example, a DDL command comprising an ALTER TABLE command is sent with a specification of instant, in-place, or copy at 314. Subsequently, a success message is received at 306 that specifies the mode that would be used to execute the command—e.g., instant, in-place, or copy.

FIG. 3C illustrates a flow for a third approach for sending a DDL command (e.g., an ALTER TABLE command) to be processed using a dry run and receiving results for the command according to some embodiments. Generally, the third approach uses a modified DDL command that includes a flag that can be set to indicate that the DDL command is to be processed using a dry run mode. Such an approach requires creation of a new DDL (dry run) command(s) or modification of an existing DDL command(s) to include an indication that the command(s) is to be processed using a dry run mode.

At 322, the DDL command is sent to the SQL frontend with an indication (e.g., flag) that the command should be processes using a dry run mode. For instance, a user device (e.g., 101) that is connected to an SQL node (e.g., 110) transmits the DDL command (e.g., ALTER TABLE command) with the indicated that the command should be processes using a dry run mode to the SQL node. In some embodiments, the DDL command comprises an ALTER TABLE command that includes a specification of an algorithm to be used (e.g., instant or in-place) for execution. In some embodiments, the DDL command does not specify an algorithm to be used.

Subsequently, the user device receives a success or failure message—e.g., from the SQL frontend at 322. In some embodiments, the success or failure message does not specify an algorithm to be used for execution of the command. Whereas in other embodiments, the success or failure message specify an algorithm to be used for execution of the command. After which the process may return to 322 to issue another DDL command with the indication that the command should be processes using a dry run mode to the SQL mode at 322.

In some embodiments, the DDL command (e.g., an ALTER TABLE instant command) is first sent at 322 with a subsequent DDL command (e.g., ALTER TABLE in-place command) at 322 in response to receipt of a failure message at 326. In some embodiments, the DDL command comprises an ALTER TABLE command that is sent at 322 with a subsequent success message indicating the algorithm that would be used to execute the command if not for the dry run. For example, an ALTER TABLE command is sent with a specification of instant, in-place, or copy at 322. Subsequently, a success message is received at 326 that specifies the mode that would be used to execute the command—e.g., instant, in-place, or copy.

Figure 4A:
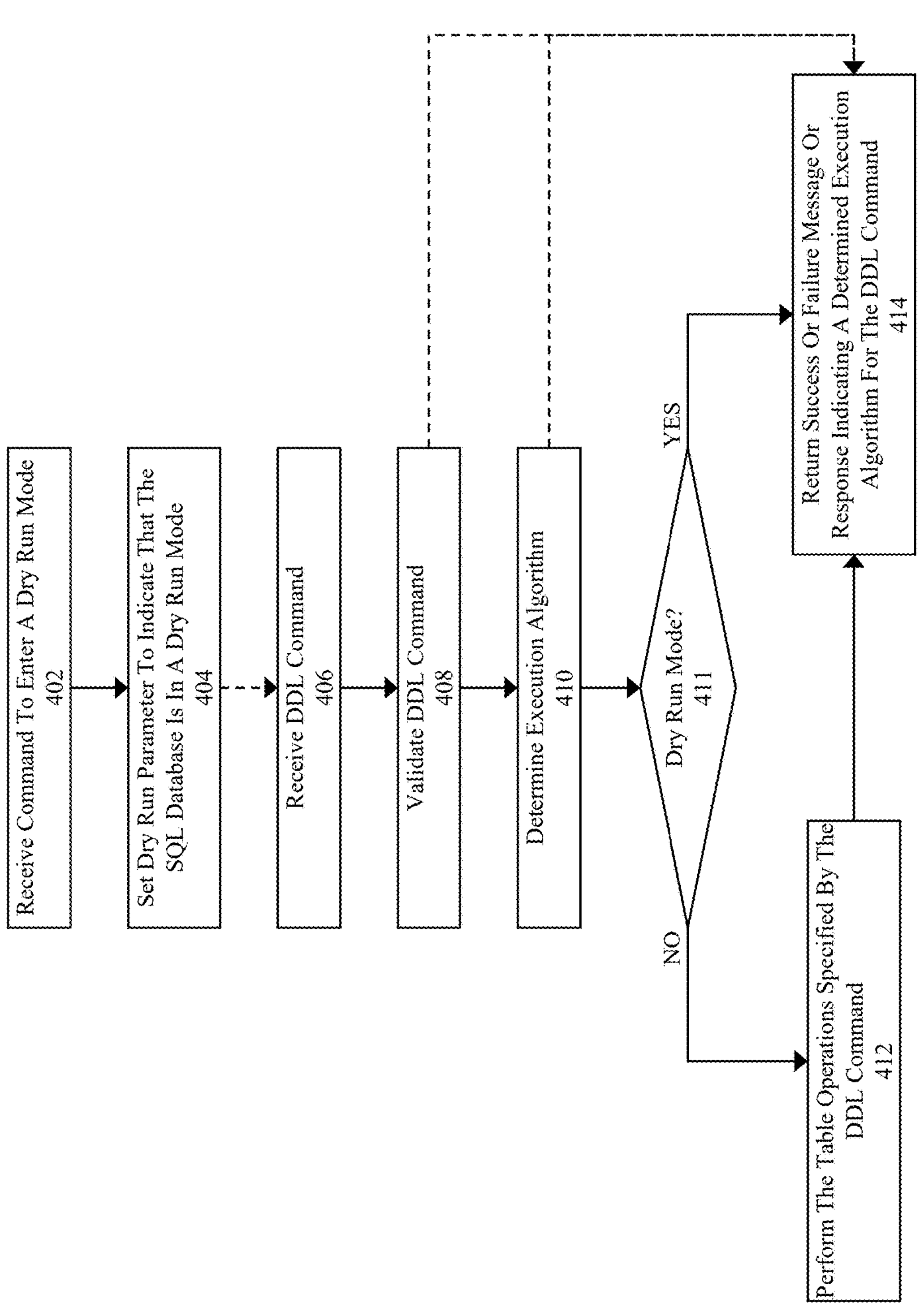
FIGS. 4A-4C illustrate flows for processing commands using a dry run mode according to some embodiments.
Figure 4B:
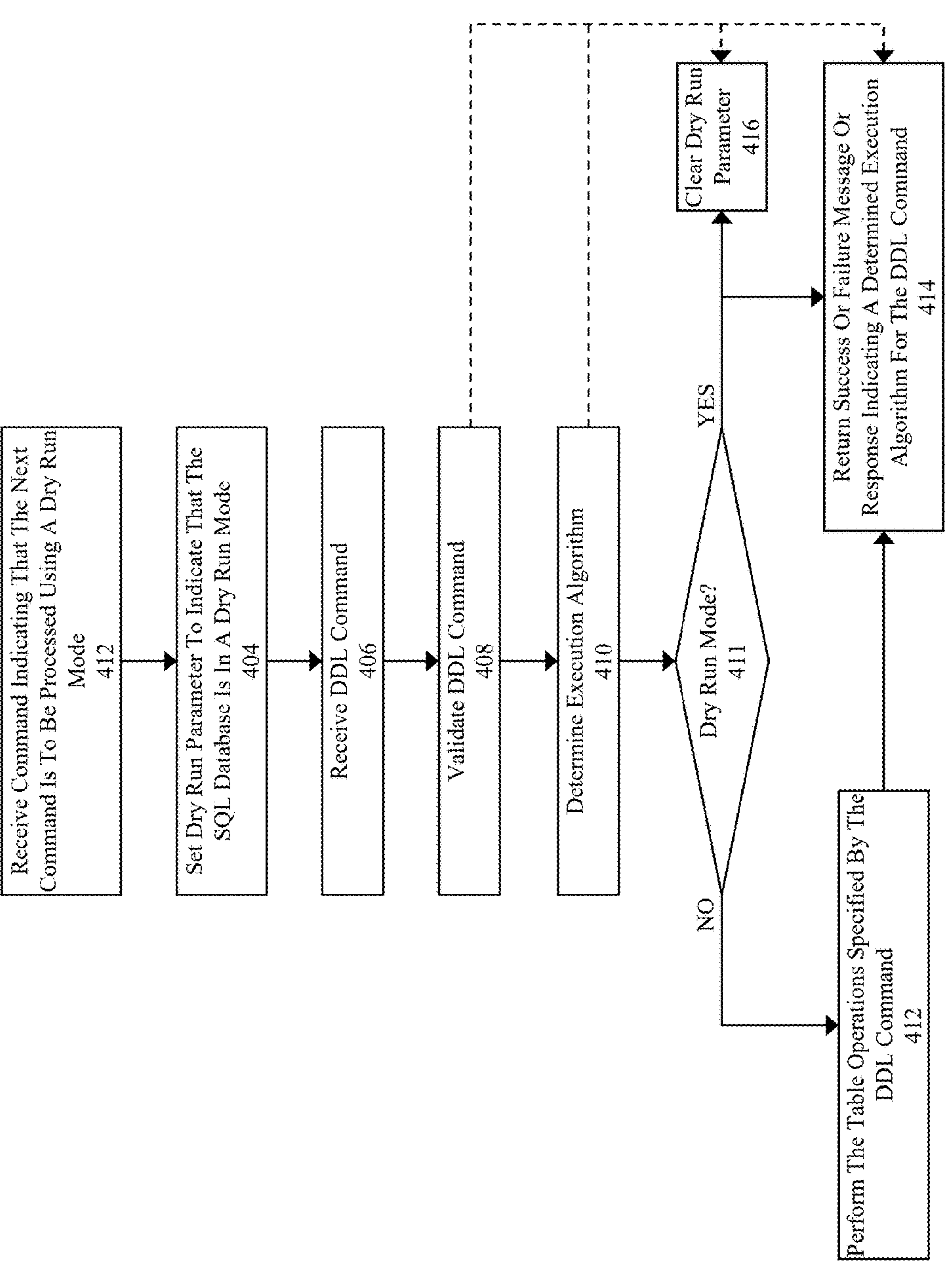
Figure 4C:
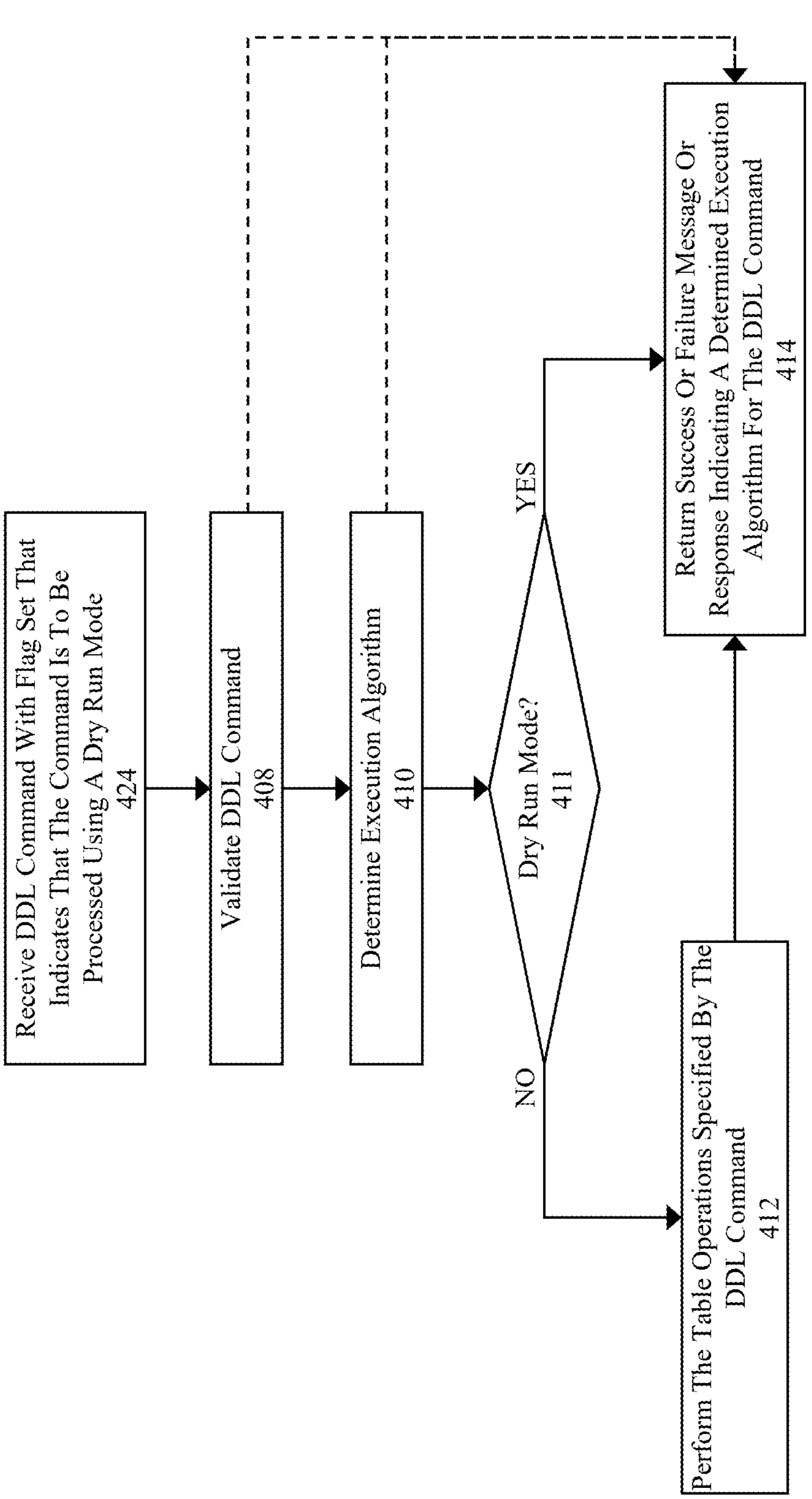

FIGS. 4A-4C illustrate flows for processing commands using a dry run mode according to some embodiments. Generally, the approach includes a processing a received DDL command (e.g., ALTER TABLE command) using a dry run approach when indicated.

FIG. 4A illustrates a first flow for processing commands using a dry run mode according to some embodiments. Generally, the approach includes a receiving a command to enter a dry run mode, set a parameter that indicates that the session is in a dry run mode, receiving a DDL command (e.g., an ALTER TABLE command), validating the DDL command, determining an execution algorithm for the DDL command, and based on whether the session is in a dry run mode, executing or not executing the DDL command before returning a success or failure message.

A command to enter a dry run mode is received at 402. For instance, a user device might transmit a command to enter a dry run mode that is received at the SQL frontend (see e.g., SQL query manager with SQL command dry run support 112 and the online transaction processing engine 114 on the SQL node 110). In response to the command to enter a dry run mode, the SQL frontend sets a parameter indicating that the SQL database is in a dry run mode at 404 (e.g., at least for the session for which the command to enter the dry run mode was received).

Subsequently, a DDL command is received at 406. For instance, a DDL command (e.g., an ALTER TABLE command) is received from a user device (e.g., 101) and routed to an SQL query manager with SQL command dry run support as discussed herein (see. e.g., discussion of FIG. 3A). Once received the SQL query manager with SQL command dry run support will parse the received DDL command to identify any errors and determine whether the command is otherwise executable at 408. Once the validation has been completed the SQL query manager with SQL command dry run support can process the command to determine an execution algorithm to be used (e.g., in the case of an ALTER TABLE command to determine whether it would be executed using an instant, in-place, or copy algorithm) at 410. In some embodiments, if the DDL command cannot be validate at 408 or a specified execution algorithm cannot be used (e.g., an ALTER TABLE command specified instant but an instant execution algorithm cannot be used or the ALTER TABLE command specified in-place but an in-place execution algorithm cannot be used) the process will proceed to 414 where a failure message is generated.

At 411 a determination is made as to whether the current session is configured in a dry run mode. For example, the parameter set in 404 is read to determine a current mode for the session. In response to the determination the process will proceed to 412 or 414 based on the of the current mode. For example, if the current mode is not a dry run mode, the process proceeds to 412 where the DDL command is executed (e.g., using the online transaction processing engine 114). After which, the process proceeds to 414 where a success or failure message is generated and potentially an indication of the execution algorithm for the DDL command. Otherwise, if the current mode is a dry run mode, the process proceeds to 414 where a success or failure message is generated and potentially an indication of the execution algorithm for the DDL command without executing the command.

FIG. 4B illustrates a second flow for processing commands using a dry run mode according to some embodiments. Generally, the approach includes receiving a command indicating that the next instruction is to be processed using a dry run mode, setting a parameter that indicates that the session is in a dry run mode, receiving a DDL command (e.g., an ALTER TABLE command), validating the DDL command, determining an execution algorithm for the DDL command, and based on whether the session is in a dry run mode, executing or not executing the DDL command before returning a success or failure message and clearing a dry run parameter if set.

A command indicating that the next instructions is to be processed using a dry run mode is received at 412. For instance, a user device might transmit a command indicating that the next instruction is to be processed using a dry run mode that is received at the SQL frontend (see e.g., SQL query manager with SQL command dry run support 112 and the online transaction processing engine 114 on the SQL node 110). In response to the command indicating that the next instruction is to be processed using a dry run mode, the SQL frontend sets a parameter indicating that the SQL database is in a dry run mode at 404 (e.g., at least for the session for which the command indicating that the next instructions is to be processed using a dry run mode was received).

Subsequently, a DDL command is received at 406. For instance, a DDL command (e.g., an ALTER TABLE command) is received from a user device (e.g., 101) and routed to an SQL query manager with SQL command dry run support as discussed herein (see. e.g., discussion of FIG. 3B). Once received the SQL query manager with SQL command dry run support will parse the received DDL command to identify any errors and determine whether the command is otherwise executable at 408. Once the validation has been completed the SQL query manager with SQL command dry run support can process the command to determine an execution algorithm to be used (e.g., in the case of an ALTER TABLE command to determine whether it would be executed using an instant, in-place, or copy algorithm) at 410. In some embodiments, if the DDL command cannot be validate at 408 or a specified execution algorithm cannot be used (e.g., the ALTER TABLE command specified instant but an instant execution algorithm cannot be used or the ALTER TABLE command specified in-place but an in-place execution algorithm cannot be used) the process will proceed to 414 where a failure message is generated and to 416 where the dry run parameter is cleared.

At 411 a determination is made as to whether the current session is configured to process the command in a dry run mode. For example, the parameter set in 404 is read to determine a current mode for the session. In response to the determination the process will proceed to 412 or 414 and 416 based on the of the current mode. For example, if the current mode is not a dry run mode, the process proceeds to 412 where the DDL command is executed (e.g., using the online transaction processing engine 114). After which the process proceeds to 414 where a success or failure message is generated and potentially an indication of the execution algorithm for the DDL command. Otherwise, if the current mode is a dry run mode, the process proceeds to 414 where a success or failure message is generated and potentially an indication of the execution algorithm for the DDL command without executing the command and to 416 where the dry run parameter is cleared.

FIG. 4C illustrates a third flow for processing commands using a dry run mode according to some embodiments. Generally, the approach includes a receiving a DDL command (e.g., an ALTER TABLE command) that indicates whether the command is to be processed using a dry run mode, validating the DDL command, determining an execution algorithm for the DDL command, and based on whether the command indicates that it is to be processed using a dry run mode, executing or not executing the DDL command before returning a success or failure message.

A DDL command that indicates whether the command is to be processed using a dry run mode is received at 406. For instance, a DDL command (e.g., an ALTER TABLE command) is received from a user device (e.g., 101) and routed to an SQL query manager with SQL command dry run support as discussed herein (see. e.g., discussion of FIG. 3A). Once received the SQL query manager with SQL command dry run support will parse the received DDL command to identify any errors and determine whether the command is otherwise executable at 408. Once the validation has been completed the SQL query manager with SQL command dry run support can process the command to determine an execution algorithm to be used (e.g., in the case of an ALTER TABLE command to determine whether it would be executed using an instant, in-place, or copy algorithm) at 410. In some embodiments, if the DDL command cannot be validate at 408 or a specified execution algorithm cannot be used (e.g., the ALTER TABLE command specified instant but an instant execution algorithm cannot be used or the ALTER TABLE command specified in-place but an in-place execution algorithm cannot be used) the process will proceed to 414 where a failure message is generated.

At 411 a determination is made as to whether the current command is to be processed using a dry run mode. For example, a flag in the instruction is read to determine a whether the command is to be processed using a dry run mode. In response to the determination the process will proceed to 412 or 414 based on the mode indicated by the flag. For example, if the DDL command does not specify use of a dry run mode, the process proceeds to 412 where the DDL command is executed (e.g., using the online transaction processing engine 114). After which the process proceeds to 414 where a success or failure message is generated and potentially an indication of the execution algorithm for the DDL command. Otherwise, if the DDL command indicates use of a dry run mode, the process proceeds to 414 where a success or failure message is generated and potentially an indication of the execution algorithm for the DDL command without executing the command.

Figure 5:
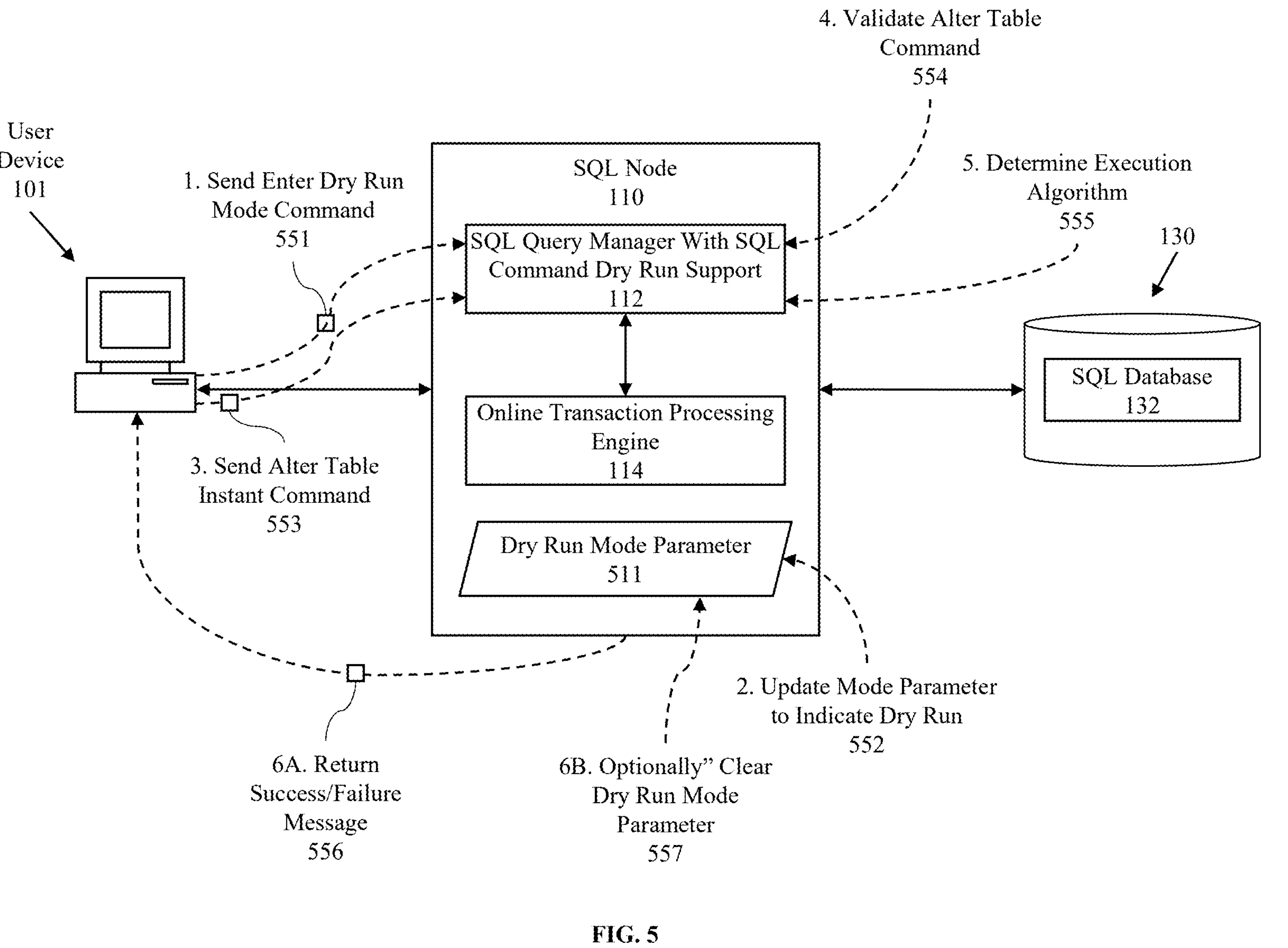
FIG. 5 illustrates an example flow for processing a DDL command comprising an ALTER TABLE instant command using a dry run mode according to some embodiments.

FIG. 5 illustrates an example flow for processing a DDL command comprising an ALTER TABLE instant command using a dry run mode according to some embodiments. Generally, the present example illustrates the use of a dry run mode that is set for a session.

FIG. 5 builds on the disclosure of FIGS. 1A-1B and includes multiple elements illustrated therein including user device 101, SQL node 110, SQL query manager with SQL command dry run support 112, online transaction processing engine 114, storage device(s) 130, and SQL database 132. The description of like identified elements discussed in regard to FIGS. 1A-1B are applicable to the present embodiment discussed in FIG. 5. In addition, FIG. 5 illustrates a dry run mode parameter 511 that can be used to indicate whether a current session is in a dry run mode. Generally, such a parameter would be session specific and thus applicable only to the corresponding session.

As an initial matter, the ALTER TABLE command is transmitted from a user device to the SQL node that specifies the entry into a dry run mode (see e.g., 101, 110, and enter dry run mode command 551). The dry run mode command is routed to the SQL query manager with SQL command dry run support (see e.g., 112), which processes the command by setting or updating a dry run mode parameter to indicate that the current session is in a dry run mode (see e.g., 552).

Once, the current session has been placed into a dry run mode, an ALTER TABLE instant command is transmitted to the SQL node (see e.g., 110) and routed to the SQL query manager with SQL command dry run support (see e.g., 112). In response to receipt of the ALTER TABLE instant command, the SQL query manager with SQL command dry run support (see e.g., 112) performs validation of the ALTER TABLE instant command (see e.g., 554) and determines the execution algorithm that would be used for the execution of the ALTER TABLE instant command (see e.g., 555). As discussed herein, if either the validation or the determined execution algorithm fails (e.g., the command cannot be processed using the instant algorithm) a failure message would be sent to the user device (see e.g., 556 and 101). On the other hand, it is determined that the ALTER TABLE instant command can be executed using the instant algorithm, a success message would be returned. In some embodiments, a user might cause the SQL node (see e.g., 110) to exit the dry run mode at (557)—e.g., if the result was success to subsequently cause the execution of the instruction.

Figure 6:
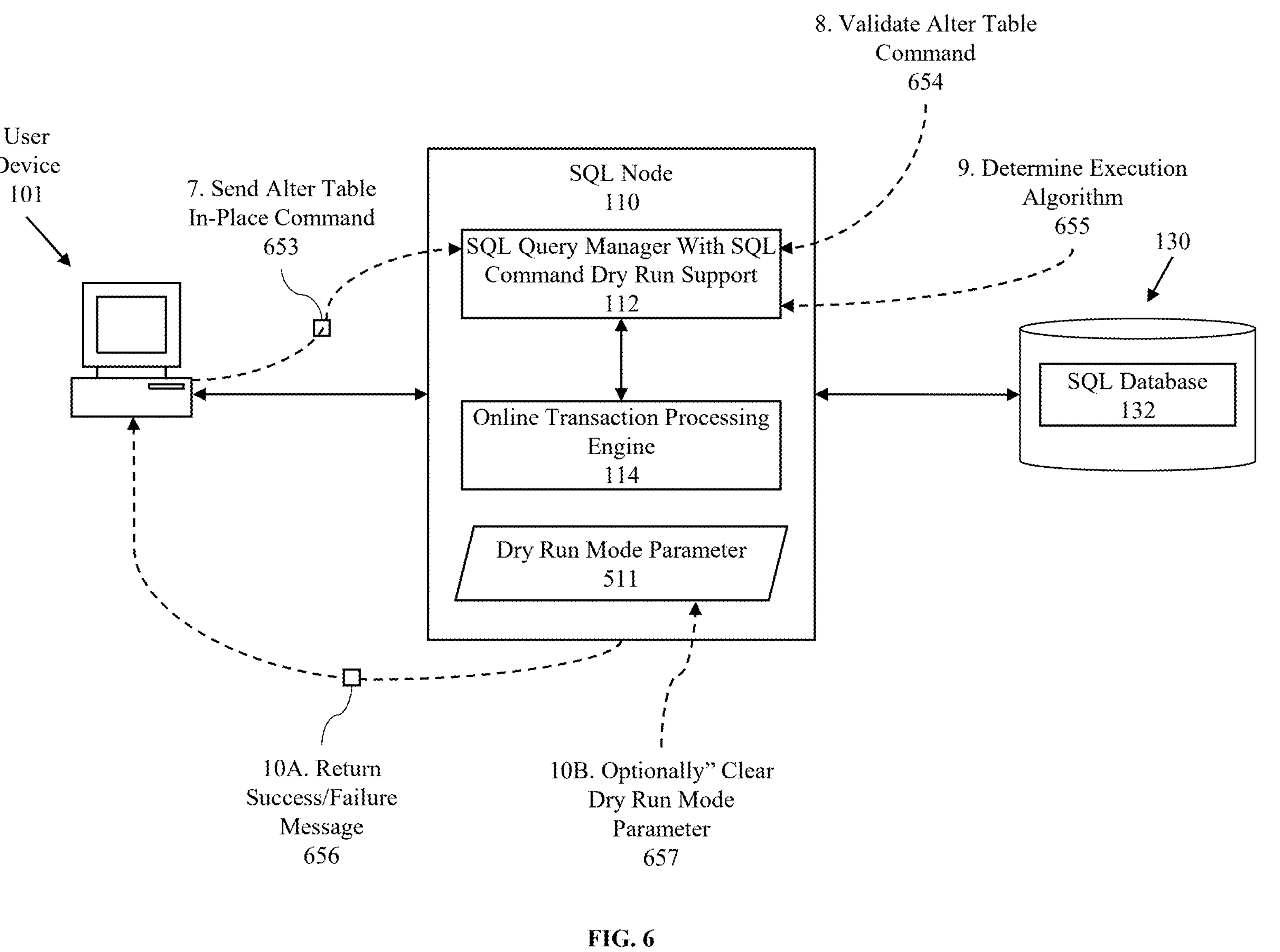
FIG. 6 illustrates an example flow for processing a DDL command comprising an ALTER TABLE in-place command using a dry run mode according to some embodiments.

FIG. 6 illustrates an example flow for processing a DDL command comprising an ALTER TABLE in-place command using a dry run mode according to some embodiments. Generally, the present example illustrates the use of a dry run mode that is set for a session. For example, the process illustrated in FIG. 5 might first be performed and in response to a determination that the ALTER TABLE instant command cannot be executed, an ALTER TABLE in-place command might be analyzed using the dry run mode.

FIG. 6 builds on the disclosure of FIGS. 1A-1B and 5 and includes multiple elements illustrated therein including user device 101, SQL node 110, SQL query manager with SQL command dry run support 112, online transaction processing engine 114, storage device(s) 130, SQL database 132, and dry run mode parameter 511. The description of like identified elements discussed in regard to FIGS. 1A-1B and 5 are applicable to the present embodiment discussed in FIG. 6. In addition, FIG. 6 illustrates an example flow that might be performed after a determination that the ALTER TABLE instance command cannot be executed and while the SQL query manager with SQL command dry run support is still in a dry run mode.

An ALTER TABLE in-place command (see e.g., 653) is transmitted to the SQL node (see e.g., 110) and routed to the SQL query manager with SQL command dry run support (see e.g., 112). In response to receipt of the ALTER TABLE in-place command, the SQL query manager with SQL command dry run support (see e.g., 112) performs validation of the ALTER TABLE in-place command (see e.g., 654) and determines the execution algorithm that would be used for the execution of the ALTER TABLE in-place command (see e.g., 655). As discussed herein, if either the validation or the determined execution algorithm fails (e.g., the command cannot be processed using the in-place algorithm) a failure message would be sent to the user device (see e.g., 656 and 101). On the other hand, if it is determined that the ALTER TABLE in-place command can be executed using the in-place algorithm, a success message would be returned. In some embodiments, a user might cause the SQL node (see e.g., 110) to exit the dry run mode at (657)—e.g., if the result was success to subsequently cause the execution of the instruction.

Figure 7:
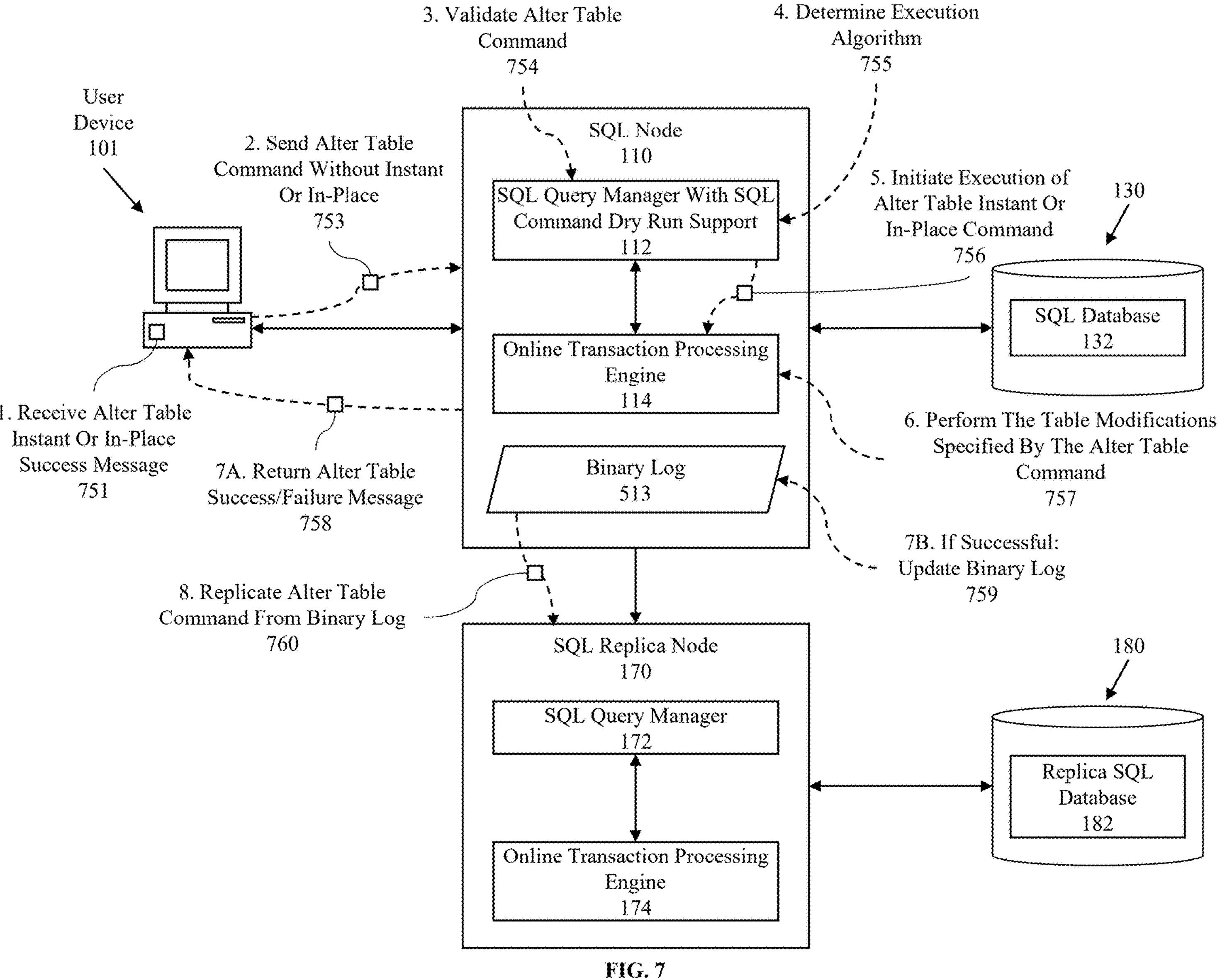
FIG. 7 illustrates an example flow for processing a DDL command comprising an ALTER TABLE instant or in place command based on results from a dry run for the ALTER TABLE instant or in-place command according to some embodiments.

FIG. 7 illustrates an example flow for processing a DDL command comprising an ALTER TABLE command based on results from a dry run for the ALTER TABLE instant or in-place command according to some embodiments. Generally, the present example illustrates the leveraging of a result of determining whether an ALTER TABLE command would be executed using an instant or in-place algorithm.

FIG. 7 builds on the disclosure of FIGS. 1A-1B, 5, and 6 and includes multiple elements illustrated therein including user device 101, SQL node 110, SQL query manager with SQL command dry run support 112, online transaction processing engine 114, storage device(s) 130, SQL database 132, SQL Replica node 170, SQL query manager 172, online transaction processing engine 174, storage device(s) 180, and SQL database 182. The description of like identified elements discussed in regard to FIGS. 1A-1B, 5, and 6 are applicable to the present embodiment discussed in FIG. 7. In addition, FIG. 7 illustrates a binary log 513 that can be used to maintain information for replicating commands to a replica SQL database.

As an initial matter, the process is triggered by an ALTER TABLE instant or in-place success message (see e.g., 751). In response, the user device sends and ALTER TABLE command without specifying that the command is to use an instant or in-place algorithm (see e.g., 753). Because the SQL query manager will use the least blocking algorithm that it can the ALTER TABLE command should be executed using an instant or in-place algorithm as determined based on at least the processing that resulted in the generation of the ALTER TABLE instant or in-place success message (see e.g., 751). In some embodiments, prior to sending the ALTER TABLE command at 753, the user device issues an exit dry run mode command to cause the SQL node to clear the dry run mode parameter 511 discussed in regard to FIGS. 5 and 6. The ALTER TABLE command is transmitted to the SQL node (see e.g., 110) and routed to the SQL query manager with SQL command dry run support (see e.g., 112). In response to receipt of the ALTER TABLE command, the SQL query manager with SQL command dry run support (see e.g., 112) performs validation of the ALTER TABLE command (see e.g., 754) and determines the execution algorithm that will be used for the execution of the ALTER TABLE command (see e.g., 755). As discussed herein, if either the validation or the determined execution algorithm fails (e.g., the command cannot be processed) a failure message would be sent to the user device (see e.g., 758 and 101).

On the other hand, if it is determined that the ALTER TABLE instant command can be executed, the SQL query manager with SQL command dry run support (see e.g., 112) will initiate the execution of the ALTER TABLE command using an instant or in-place algorithm (see e.g., 756). Subsequently, the online transaction processing engine (see e.g., 114) will perform the table modifications indicated by the ALTER TABLE command (see e.g., 757). Upon a successful completion of the performance of the indicated table modifications the process will return an ALTER TABLE success message (see e.g., 758) to the user device (see e.g., 101). Additionally, a successful completion would also result in updating or creating a record to represent the ALTER TABLE command in a data structure for reproduction at another location. For instance, a binary log might be updated to include a copy of the received ALTER TABLE command (see e.g., 759 and binary log 513). However, failure to complete the performance of the indicated table modifications would result in the return of an ALTER TABLE failure message (see e.g., 758) to the user device (see e.g., 101). Presuming that the ALTER TABLE command is completed successfully, the ALTER TABLE command will be reproduced from the binary log (see e.g., 760) and transmitted to the SQL replica node (see e.g., 170) for execution against the replica SQL database (see e.g., 182).

System Architecture

Figure 8:
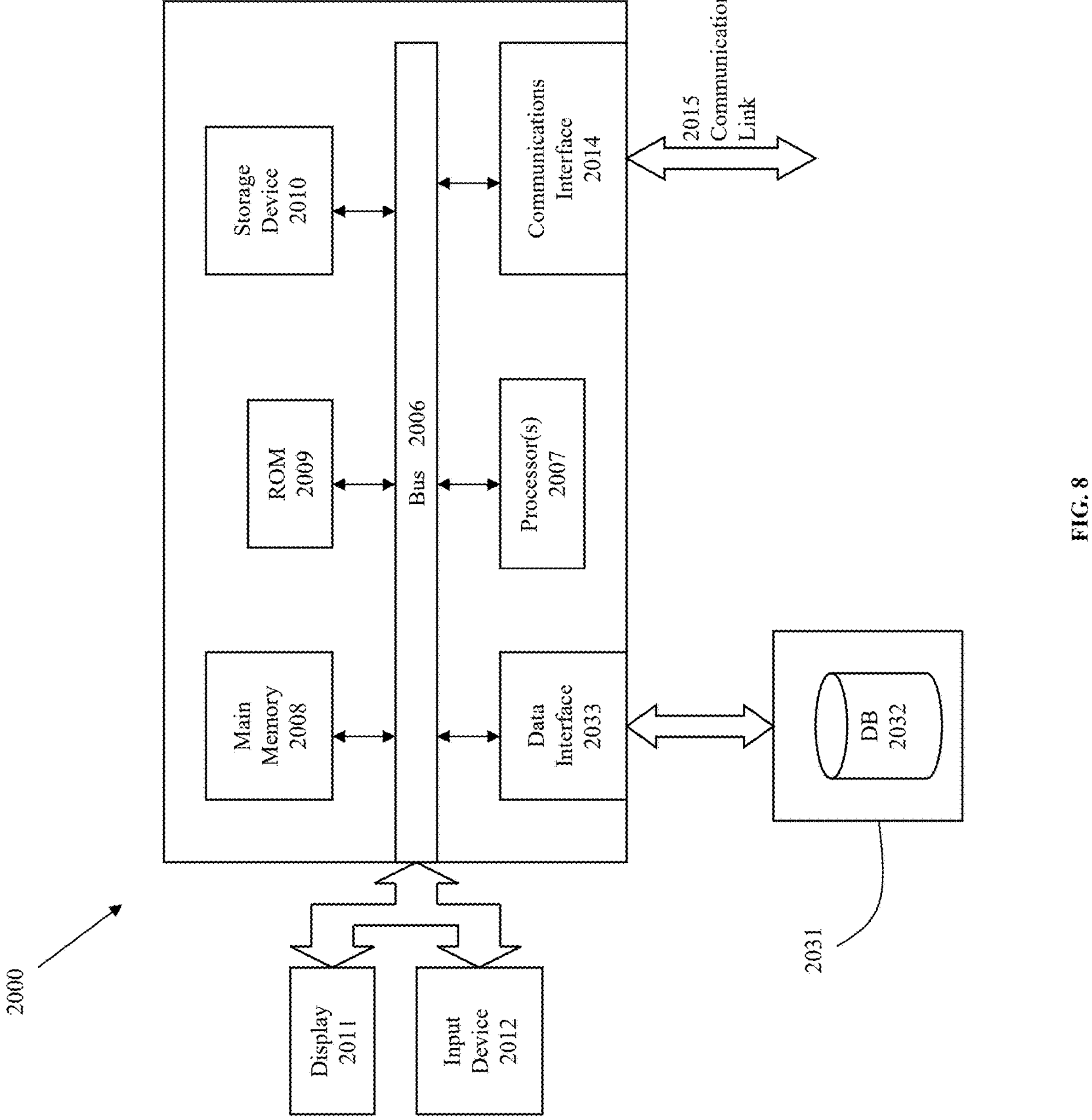
FIG. 8 is a diagram of a computing system suitable for implementing an embodiment of the present disclosure.
Figure 9:
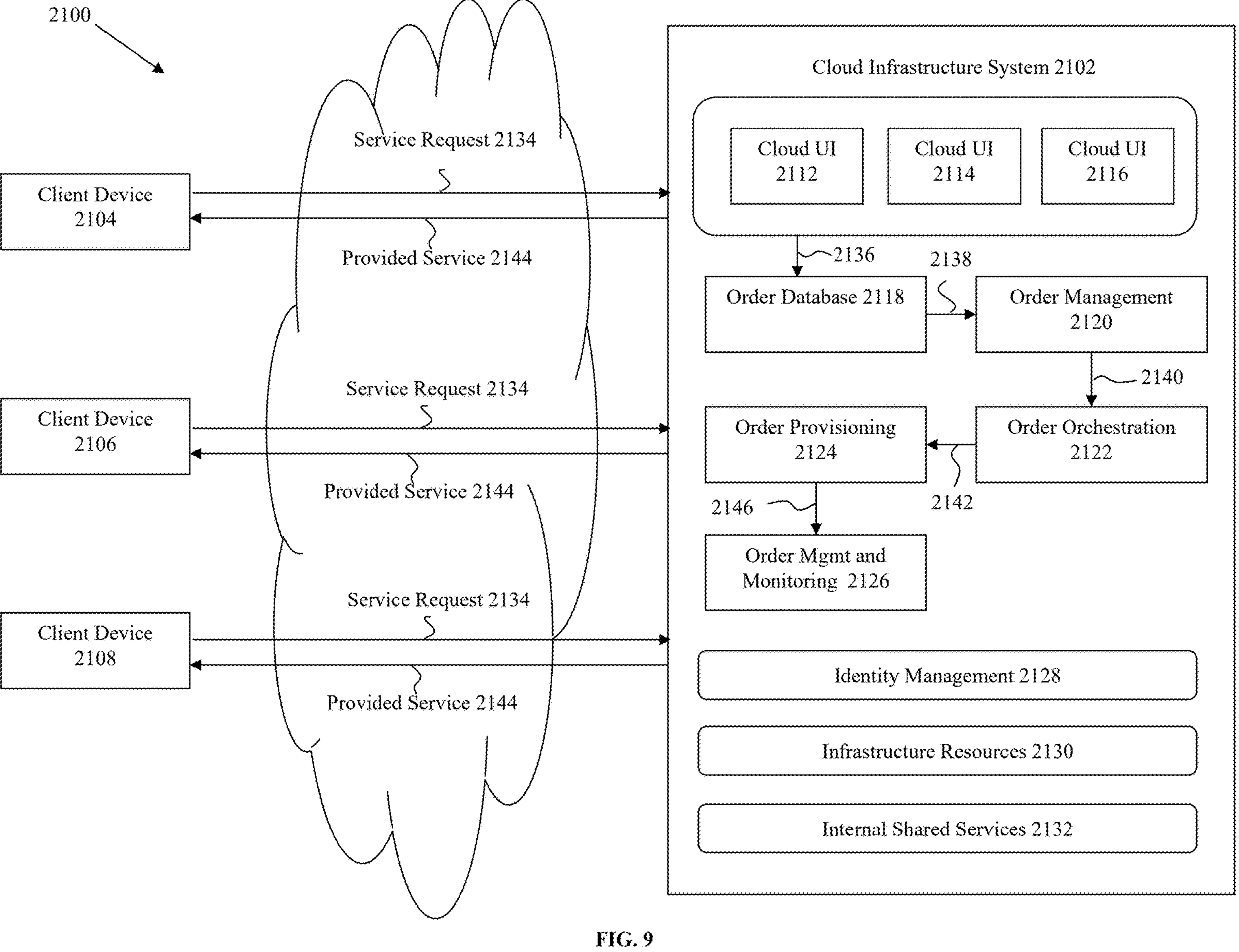
FIG. 9 is a block diagram of one or more components of a system environment in which services may be offered as cloud services, in accordance with an embodiment of the present invention.

FIG. 8 is a block diagram of an illustrative computing system 2000 suitable for implementing an embodiment of the present invention. Computer system 2000 includes a bus 2006 or other communication mechanism for communicating information, which interconnects subsystems and devices, such as processor 2007, system memory 2008 (e.g., RAM), static storage device 2009 (e.g., ROM), disk drive 2010 (e.g., magnetic or optical), communication interface 2014 (e.g., modem or Ethernet card), display 2011 (e.g., CRT or LCD), input device 2012 (e.g., keyboard), and cursor control.

According to one embodiment of the invention, computer system 2000 performs specific operations by processor 2007 executing one or more sequences of one or more instructions contained in system memory 2008. Such instructions may be read into system memory 2008 from another computer readable/usable medium, such as static storage device 2009 or disk drive 2010. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 2007 for execution. Such a medium may take many forms, including but not limited to, non-volatile media and volatile media. Non-volatile media includes, for example, optical or magnetic disks, such as disk drive 2010. Volatile media includes dynamic memory, such as system memory 2008.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 2000. According to other embodiments of the invention, two or more computer systems 2000 coupled by communication link 2015 (e.g., LAN, PTSN, or wireless network) may perform the sequence of instructions required to practice the invention in coordination with one another.

Computer system 2000 may transmit and receive messages, data, and instructions, including program, i.e., application code, through communication link 2015 and communication interface 2014. Received program code may be executed by processor 2007 as it is received, and/or stored in disk drive 2010, or other non-volatile storage for later execution. Data may be accessed from a database 2032 that is maintained in a storage device 2031, which is accessed using data interface 2033.

FIG. 21 is a simplified block diagram of one or more components of a system environment 2100 by which services provided by one or more components of an embodiment system may be offered as cloud services, in accordance with an embodiment of the present disclosure. In the illustrated embodiment, system environment 2100 includes one or more client computing devices 2104, 2106, and 2108 that may be used by users to interact with a cloud infrastructure system 2102 that provides cloud services. The client computing devices may be configured to operate a client application such as a web browser, a proprietary client application, or some other application, which may be used by a user of the client computing device to interact with cloud infrastructure system 2102 to use services provided by cloud infrastructure system 2102.

It should be appreciated that cloud infrastructure system 2102 depicted in the figure may have other components than those depicted. Further, the embodiment shown in the figure is only one example of a cloud infrastructure system that may incorporate an embodiment of the invention. In some other embodiments, cloud infrastructure system 2102 may have more or fewer components than shown in the figure, may combine two or more components, or may have a different configuration or arrangement of components.

Client computing devices 2104, 2106, and 2108 may be devices similar to those described above for FIG. 7. Although system environment 2100 is shown with three client computing devices, any number of client computing devices may be supported. Other devices such as devices with sensors, etc. may interact with cloud infrastructure system 2102.

Network(s) 2110 may facilitate communications and exchange of data between clients 2104, 2106, and 2108 and cloud infrastructure system 2102. Each network may be any type of network familiar to those skilled in the art that can support data communications using any of a variety of commercially available protocols. Cloud infrastructure system 2102 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 2102 may include a suite of applications, middleware, and database service offerings that are delivered to a customer in a self-service, subscription-based, elastically scalable, reliable, highly available, and secure manner.

In various embodiments, cloud infrastructure system 2102 may be adapted to automatically provision, manage and track a customer's subscription to services offered by cloud infrastructure system 2102. Cloud infrastructure system 2102 may provide the cloud services via different deployment models. For example, services may be provided under a public cloud model in which cloud infrastructure system 2102 is owned by an organization selling cloud services and the services are made available to the general public or different industry enterprises. As another example, services may be provided under a private cloud model in which cloud infrastructure system 2102 is operated solely for a single organization and may provide services for one or more entities within the organization. The cloud services may also be provided under a community cloud model in which cloud infrastructure system 2102 and the services provided by cloud infrastructure system 2102 are shared by several organizations in a related community. The cloud services may also be provided under a hybrid cloud model, which is a combination of two or more different models.

In some embodiments, the services provided by cloud infrastructure system 2102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2102. Cloud infrastructure system 2102 then performs processing to provide the services in the customer's subscription order.

In some embodiments, the services provided by cloud infrastructure system 2102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 2102 may also include infrastructure resources 2130 for providing the resources used to provide various services to customers of the cloud infrastructure system. In one embodiment, infrastructure resources 2130 may include pre-integrated and optimized combinations of hardware, such as servers, storage, and networking resources to execute the services provided by the PaaS platform and the SaaS platform.

In some embodiments, resources in cloud infrastructure system 2102 may be shared by multiple users and dynamically re-allocated per demand. Additionally, resources may be allocated to users in different time zones. For example, cloud infrastructure system 2130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 2132 may be provided that are shared by different components or modules of cloud infrastructure system 2102 and by the services provided by cloud infrastructure system 2102. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

In certain embodiments, cloud infrastructure system 2102 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 2102, and the like.

In one embodiment, as depicted in the figure, cloud management functionality may be provided by one or more modules, such as an order management module 2120, an order orchestration module 2122, an order provisioning module 2124, an order management and monitoring module 2126, and an identity management module 2128. These modules may include or be provided using one or more computers and/or servers, which may be general purpose computers, specialized server computers, server farms, server clusters, or any other appropriate arrangement and/or combination.

In operation 2134, a customer using a client device, such as client device 2104, 2106 or 2108, may interact with cloud infrastructure system 2102 by requesting one or more services provided by cloud infrastructure system 2102 and placing an order for a subscription for one or more services offered by cloud infrastructure system 2102. In certain embodiments, the customer may access a cloud User Interface (UI), cloud UI 2112, cloud UI 2114 and/or cloud UI 2116 and place a subscription order via these UIs. The order information received by cloud infrastructure system 2102 in response to the customer placing an order may include information identifying the customer and one or more services offered by the cloud infrastructure system 2102 that the customer intends to subscribe to.

After an order has been placed by the customer, the order information is received via the cloud UIs, 2112, 2114 and/or 2116. At operation 2136, the order is stored in order database 2118. Order database 2118 can be one of several databases operated by cloud infrastructure system 2118 and operated in conjunction with other system elements. At operation 2138, the order information is forwarded to an order management module 2120. In some instances, order management module 2120 may be configured to perform billing and accounting functions related to the order, such as verifying the order, and upon verification, booking the order. At operation 2140, information regarding the order is communicated to an order orchestration module 2122. Order orchestration module 2122 may utilize the order information to orchestrate the provisioning of services and resources for the order placed by the customer. In some instances, order orchestration module 2122 may orchestrate the provisioning of resources to support the subscribed services using the services of order provisioning module 2124.

In certain embodiments, order orchestration module 2122 enables the management of business processes associated with each order and applies business logic to determine whether an order should proceed to provisioning. At operation 2142, upon receiving an order for a new subscription, order orchestration module 2122 sends a request to order provisioning module 2124 to allocate resources and configure those resources needed to fulfill the subscription order. Order provisioning module 2124 enables the allocation of resources for the services ordered by the customer. Order provisioning module 2124 provides a level of abstraction between the cloud services provided by cloud infrastructure system 2102 and the physical implementation layer that is used to provision the resources for providing the requested services. Order orchestration module 2122 may thus be isolated from implementation details, such as whether or not services and resources are provisioned on the fly or pre-provisioned and only allocated/assigned upon request.

At operation 2144, once the services and resources are provisioned, a notification of the provided service may be sent to customers on client devices 2104, 2106 and/or 2108 by order provisioning module 2124 of cloud infrastructure system 2102.

At operation 2146, the customer's subscription order may be managed and tracked by an order management and monitoring module 2126. In some instances, order management and monitoring module 2126 may be configured to collect usage statistics for the services in the subscription order, such as the amount of storage used, the amount data transferred, the number of users, and the amount of system up time and system down time.

In certain embodiments, cloud infrastructure system 2102 may include an identity management module 2128. Identity management module 2128 may be configured to provide identity services, such as access management and authorization services in cloud infrastructure system 2102. In some embodiments, identity management module 2128 may control information about customers who wish to utilize the services provided by cloud infrastructure system 2102. Such information can include information that authenticates the identities of such customers and information that describes which actions those customers are authorized to perform relative to various system resources (e.g., files, directories, applications, communication ports, memory segments, etc.) Identity management module 2128 may also include the management of descriptive information about each customer and about how and by whom that descriptive information can be accessed and modified.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

Additionally, the approach disclosed herein for an approach to determine an algorithm to be used with data definition language (DDL) statements that addresses at least some of the issues of prior techniques suffer from, such as challenges to maintaining uptime while also maintaining consistency with replicas.

What is claimed is:

1. A computer-implemented method, comprising:

maintaining a first database and a second database, wherein the first database is associated with a structured query language (SQL) database frontend, and the second database is a replica of the first database;

receiving a data definition language (DDL) command at the SQL database frontend to be processed using a dry run mode, wherein commands executed using the dry run mode are not permitted to modify the first database, and an algorithm that would be used to execute the DDL command is identified using the dry run mode;

determining, based on the identified algorithm, whether to execute the DDL command; and in response to a determination to execute the DDL command:

executing the DDL command at the first database, wherein the identified algorithm is used to execute the DDL command at the first database; and executing the DDL command at the second database, wherein the DDL command is executed without specifying the algorithm to be used at the second database.

2. The computer-implemented method of claim 1, wherein the DDL command is executed at the first database without specifying the algorithm to be used and the DDL command is executed at the second database using the same algorithm.

3. The computer-implemented method of claim 1, wherein the first database has a first schema and the second database has a second schema that is different from the first schema.

4. The computer-implemented method of claim 3, wherein the first schema comprises at least a character type specification at a level of a column of a first table and the second schema comprises a character type specified at a level of a second table, wherein the second table is a replica of the first table.

5. The computer-implemented method of claim 1, further comprising:

receiving a dry run mode command at the SQL database frontend; and setting a parameter to indicate that the SQL database frontend is in a dry run mode.

6. The computer-implemented method of claim 5, wherein the parameter is cleared in response to completing processing of the DDL command.

7. The computer-implemented method of claim 5, wherein the DDL command comprises at least a value that indicates that the command is to be processed using a dry run mode.

8. The computer-implemented method of claim 5, wherein the DDL command comprises an ALTER TABLE command that specifies the use of an instant algorithm or an in-place algorithm.

9. A non-transitory computer readable medium having stored thereon a sequence of instructions which, when executed by a processor, cause a set of acts comprising:

maintaining a first database and a second database, wherein the first database is associated with a structured query language (SQL) database frontend, and the second database is a replica of the first database;

receiving a data definition language (DDL) command at the SQL database frontend to be processed using a dry run mode, wherein commands executed using the dry run mode are not permitted to modify the first database, and an algorithm that would be used to execute the DDL command is identified using the dry run mode;

determining, based on the identified algorithm, whether to execute the DDL command; and in response to a determination to execute the DDL command:

executing the DDL command at the first database, wherein the identified algorithm is used to execute the DDL command at the first database; and executing the DDL command at the second database, wherein the DDL command is executed without specifying the algorithm to be used at the second database.

10. The computer readable medium of claim 9, wherein the DDL command is executed at the first database without specifying the algorithm to be used and the DDL command is executed at the second database using the same algorithm.

11. The computer readable medium of claim 9, wherein the first database has a first schema and the second database has a second schema that is different from the first schema.

12. The computer readable medium of claim 11, wherein the first schema comprises at least a character type specification at a level of a column of a first table and the second schema comprises a character type specified at a level of a second table, wherein the second table is a replica of the first table.

13. The computer readable medium of claim 9, wherein the set of acts further comprise:

receiving a dry run mode command at the SQL database frontend; and setting a parameter to indicate that the SQL database frontend is in a dry run mode.

14. The computer readable medium of claim 13, wherein the parameter is cleared in response to completing processing of the DDL command.

15. The computer readable medium of claim 13, wherein the DDL command comprises at least a value that indicates that the command is to be processed using a dry run mode.

16. The computer readable medium of claim 13, wherein the DDL command comprises an ALTER TABLE command that specifies the use of an instant algorithm or an in-place algorithm.

17. A computing system comprising:

a memory to hold a set of instructions;

a computer processor to execute the set of instructions, which when executed cause a set of acts comprising:

maintaining a first database and a second database, wherein the first database is associated with a structured query language (SQL) database frontend, and the second database is a replica of the first database;

receiving a data definition language (DDL) command at the SQL database frontend to be processed using a dry run mode, wherein commands executed using the dry run mode are not permitted to modify the first database, and an algorithm that would be used to execute the DDL command is identified using the dry run mode;

determining, based on the identified algorithm, whether to execute the DDL command; and in response to a determination to execute the DDL command:

executing the DDL command at the first database, wherein the identified algorithm is used to execute the DDL command at the first database; and executing the DDL command at the second database, wherein the DDL command is executed without specifying the algorithm to be used at the second database.

18. The computing system of claim 17, wherein the DDL command is executed at the first database without specifying the algorithm to be used and the DDL command is executed at the second database using the same algorithm.

19. The computing system of claim 17, wherein the first database has a first schema and the second database has a second schema that is different from the first schema.

20. The computing system of claim 19, wherein the first schema comprises at least a character type specification at a level of a column of a first table and the second schema comprises a character type specified at a level of a second table, wherein the second table is a replica of the first table.

* * * * *